United States Patent
Fordham

[15] 3,650,244
[45] Mar. 21, 1972

[54] METHOD AND APPARATUS FOR PROTECTING AND ENHANCING THE GROWTH OF YOUNG SHELLFISH SETS

[72] Inventor: Edwin C. Fordham, 336 Park Street, Stratford, Conn. 06902

[22] Filed: Dec. 18, 1969

[21] Appl. No.: 886,125

[52] U.S. Cl. ................................................................119/4
[51] Int. Cl. ...........................................................A01k 61/00
[58] Field of Search ..................................................119/4, 2

[56] References Cited

UNITED STATES PATENTS

| | | | |
|---|---|---|---|
| 239,592 | 3/1881 | Weems | 119/4 |
| 249,942 | 11/1881 | Hughes | 119/4 |
| 463,397 | 11/1891 | Walton, Sr. | 119/4 |
| 1,660,259 | 2/1928 | Elsworth | 119/4 |
| 2,989,945 | 6/1961 | Ford | 119/4 |
| 3,499,421 | 3/1970 | MacDonald et al. | 119/2 |

Primary Examiner—Hugh R. Chamblee
Attorney—Arthur T. Fattibene

[57] ABSTRACT

This disclosure is directed to a method and apparatus for protecting and enhancing the growth of young oysters or shellfish sets in their natural environment. This is attained by placing "clutchless sets" into trays constructed to entrap the "clutchless sets" therein while permitting the free flow of sea water therethrough to supply the contained "clutchless sets" with natural food, and by floating the trays in groups adjacent the warmer upper strata of the sea water. The arrangement protects the "clutchless sets" from their natural enemies, and renders them readily movable from place to place as may be required until such time that they may be safely placed into their permanent bed to grow naturally to maturity.

14 Claims, 13 Drawing Figures

PATENTED MAR 21 1972 3,650,244

INVENTOR
EDWIN C. FORDHAM
BY
*Arthur F. Faltibene*
ATTORNEY

INVENTOR.
EDWIN C. FORDHAM
BY
Arthur G. Fattibene
ATTORNEY

INVENTOR.
EDWIN C. FORDHAM
BY
Arthur G. Fattibene
ATTORNEY 3,650,244

METHOD AND APPARATUS FOR PROTECTING AND ENHANCING THE GROWTH OF YOUNG SHELLFISH SETS

PRIOR ART AND PROBLEMS

Heretofore, the propagation of oysters and various other shellfish has been entirely dependent on nature and/or the balance of elements existing in nature. For this reason the oyster or shellfish industry was highly unpredictable, thereby rendering any prediction of future production yields virtually impossible. The occurrence of "oyster sets" could not be readily forecasted chiefly because of the changing ecological conditions and life cycle of the animal itself. For example the life cycle of an oyster contains a swimming or larvae stage lasting for approximately 16 days after which the animal undergoes morphological changes at which time it attaches itself to a substrate, e.g., shell or fragment, and grows to adulthood.

During the larvae stage or free swimming stage, the young oyster swims continuously, drifting with the currents and feeding on the algae and other micro-organisms in the water. Also during this period the swimming larvae are affected by the elements such as wind, rain, currents and water temperatures, pollutions, predators, etc. Consequently the mortality rate of such swimming larvae is exceedingly high.

Even after the oyster has set, the oysters or sets are subjected to natural hazards such as silting from storms, predators, such as starfish and drills, and pollution. In recent times these conditions have so increased that in many areas the oyster or shellfish industry has all but vanished. In many areas where the industry once thrived, there is none today.

To obviate the natural difficulties encountered in propagating oysters and various other shellfish, efforts are being made to raise such animals in hatcheries, under controlled conditions. To date various methods have been employed in hatching eggs and caring for the larvae during their swimming stages. However, once the larvae have reached their setting stages, they were customarily placed in the sea in setting beds for their continued growth. However, the young "sets" were still subjected to natural enemies such as starfish, drills, pollution, water temperature, currents, silt and the like. For these reasons many such young "sets" would fail to reach maturity.

OBJECTS

It is therefore an object of this invention to provide an improved method and apparatus for caring for young "sets" until such time that they are sufficiently large so as to withstand and survive the natural environment of the sea or oyster bed, and thereby reach maturity.

Another object is to provide a method and means whereby the young oyster sets or the like can be individually grown to such size that when placed in the beds they can better survive such predators as drills and starfish.

Another object is to provide a method and means for caring for young "oyster sets" or the like in a manner which permits the "sets" to be readily moved from place to place as desired.

Another object is to provide a method and means which facilitates the handling and feeding of young oyster sets or the like.

Another object is to provide a method and means whereby the young "oyster sets" can be placed in a natural environment, and yet be completely protected from their natural enemies.

Another object is to provide a method and means whereby the young oyster sets can be raised in their natural environment as individual, clutchless oysters.

Another object is to provide a method and means whereby the young "sets" can be maintained in a natural environment adjacent the upper surface of the sea and/or in the warmer temperature zone of the sea where the natural food is more plentiful and thereby resulting in accelerated growth of the young "sets".

Another object is to provide a method and means in which a maximum number of young sets can be raised in a minimum of space.

BRIEF SUMMARY OF THE INVENTION

The foregoing objects and other features and advantages of this invention are attained by a method of placing young clutchless individual "oyster sets" or the like into a tray having perforations formed therein to provide for the free flow of sea water therethrough. The perforations are sized as to maintain the "oyster sets" confined within the tray. The tray with the confined "oyster sets" or the like is then floated in a natural sea water environment in a manner so that the tray remains submerged in the uppermost strata of the natural sea water where the temperature of the water tends to be warmest. In this manner the confined "oyster sets" are protected from their natural enemies and/or predators during their formative growing period. The method also provides for the natural wave action of the sea in flowing through the tray to prevent the clutchless and individual "oyster sets" from setting to the trays. The method further contemplates the stacking and securing of several trays, and maintaining the stacked trays submerged for providing the raising of the maximum number of sets in a minimum of space.

An apparatus to facilitate the handling and caring for the young "oyster sets" during their formative setting stages comprises a tray having a screened bottom wall and a circumscribing connecting side wall. The arrangement is such that the screened portions of the tray permit the free flow of water therethrough, while at the same time confine the individual clutchless "oyster set" within the tray. To conserve space the respective trays are supported in superposed stacked relationship so that the bottom of one tray forms the top of the next subjacent tray. A holding or stacking frame means is provided for maintaining and/or securing the stacked trays in position with respect to one another. The stacking frame means comprises a pair of complementary frame members, each including a bottom or base member, and opposed connected upright members. The bottom members of the complementary frame members are angularly disposed so that a stack of trays may be supported thereon so that the respective opposed uprights define the corner guides or supports for the stacked trays. A first means is provided for securing the stacked trays to one of the frame members and a second securing means is provided for securing the stacked trays and connected frame member to the other frame member.

Means are provided for floating the respective stacked trays containing the confined "oyster sets" or the like adjacent the upper strata of sea water. This means includes an open raft or float having transversely extending support members on which the respective stacked trays and associated stacking frame are supported. Preferably one of the frame members is fixedly secured to the transversely extending supports of the float while the other frame member and associated trays are releasably secured to the fixedly secured frame member. The float is sized so as to contain a plurality of such stacked trays, and a cover means is provided for containing the respective stacked trays of "oyster sets" within the float. The arrangement is such that the entire float is rendered sufficiently buoyant so that the upper end thereof is substantially level with the surface of the sea water. The open construction of the float permits the free flow of the sea water therethrough so that the "oyster sets" within the respective trays are maintained in a submerged position with the natural wave of the sea washing over the "oyster sets" to maintain them in a clutchless state until such time that they are sufficiently grown so that they may be permanently placed on the oyster beds to set and mature.

FEATURES

A feature of this invention resides in the provision wherein the specific tray constructions in which the "oyster sets" are confined can be readily stacked and maintained in stacked relationship so that the stacked trays may be readily floated adjacent the upper strata of the sea water.

Another feature of this invention resides in the provision of a float or raft specifically constructed and arranged so as to accommodate a plurality of stacked trays of "oyster sets" so that the maximum number of "oyster sets" can be maintained in a minimum amount of space.

Another feature of this invention resides in the specific construction of frame means utilized for securing the plurality of trays of "oyster sets" in stacked position.

Another feature resides in the provision of a complementary stacking frame construction for accommodating a plurality of stacked trays of "oyster sets" whereby the stacked trays may be firmly secured in position to an open float and which trays may be readily removed therefrom in their stacked relationship.

Another feature of this invention resides in the provision of a specific method of handling and raising clutchless "oyster sets" in their natural environment until such time that they are sufficiently grown in a clutchless state for planting in their natural or permanent bed whereby they can withstand and survive their natural enemies such as drills and/or starfish.

Other features and advantages will become more readily apparent when considered in view of the drawings and specifications in which FIG. 1 illustrates a fragmentary perspective view of an open raft or float construction for containing the oyster sets and the like in accordance with this invention.

DETAILED SPECIFICATIONS

Figure 1:
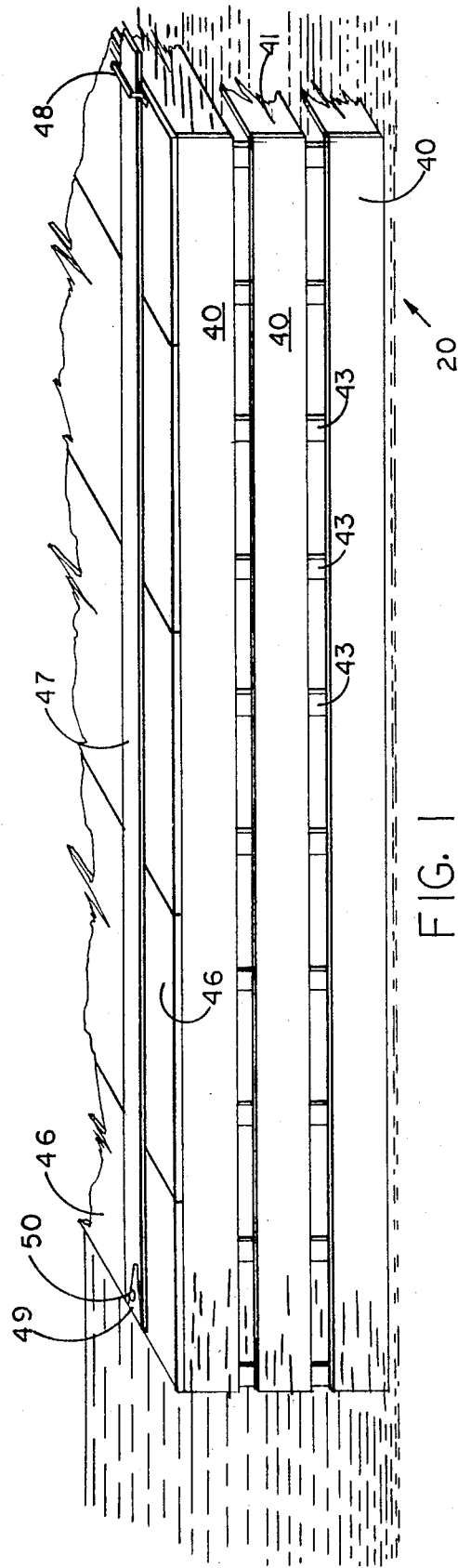

This invention is directed to a method of protecting and enhancing the growth of young "oyster sets" or other shellfish, in a natural environment. Present day technology concerning the raising and cultivating of oysters and related shellfish involves the hatching of the eggs and the caring of the swimming larvae in a controlled hatchery environment. Generally such oysters larvae are maintained under controlled conditions until such time that they have begun to set. After the young oyster has metomophically changed from its swimming stage to its setting stage, they were then generally placed in the sea or setting beds to grow to maturity.

Because the young oysters are still of extremely small size when they begin to set, the young oyster sets when initially placed in the sea are rendered extremely vulnerable to natural enemies, such as drills, starfish, and to the elements such as currents, water temperatures, pollution and the like. For this reason the mortality rate of the young oyster sets has been, prior to this invention, running exceedingly high.

The present method of protecting and enhancing the growth of such young "sets" so that more of the "sets" can reach maturity comprises the steps of maintaining the young sets clutchless and placing a plurality of individual clutchless oyster "sets" when they have reached a predetermined size, e.g., one-eighth of an inch, in a hatchery into trays or containers having perforated wall portions to permit the free flow of sea water therethrough. The perforations of the container or trays are naturally sized to confine the young sets therein. The trays are then floated individually and/or in stacks adjacent the upper stratum or surface of the sea water where the water temperature is the warmest. The perforation of the trays function to permit the natural wave action of the sea to continually wash over the young set to maintain the young set clutchless while at the same time permitting the natural algae and/or micro-organism food to reach the young sets.

The method of this invention further contemplates the stacking of a plurality of trays of young oyster sets so that a maximum number of oyster sets can be cared for in a minimum of sea space. To facilitate the mass movement of such trays of oyster sets, the method of this invention further contemplates locating a plurality of oyster set trays in an open float or raft construction specifically designed to accommodate and hold a large number of such trays in a submerged position adjacent the upper layers or surface of the sea.

Accordingly, the mass of stacked trays of young oyster sets can be readily moved from place to place by towing the raft to the desired sheltered areas. In this manner the oyster sets can be readily moved from place to place as may be required. Thus in the event of storm, the oyster sets can be moved to safe shelter. Also should a particular area become contaminated, the float of oyster sets can be moved to a clean area. Also the floats of oyster sets can be moved in the event of any change in weather conditions which may adversely affect the young sets.

All the while the oyster sets are maintained in the tray and/or floats, they are further protected from the sea life that normally preys on such sets, e.g., drills and/or starfish. Heretofore, the maneuverability of the young oyster sets was not possible, since once the young sets had been placed in the sea they would attach and become a permanent part of the oyster bed.

The trays of young sets are further floated adjacent the surface of the sea water. The purpose for so floating the trays of oyster sets adjacent the surface is that the water temperatures are generally warmest at the surface. Accordingly, the warmer water temperature in the vicinity of the surface enhances the growth of the young sets. Also a greater abundance of natural food can be found adjacent the surface of the sea. Thus with more food and warmer water temperature, the sheltered oyster sets can grow at a more rapid rate.

When the young oyster sets reach a predetermined size, e.g., 1 inch, they are removed from the trays and placed in the natural beds to grow to maturity. Thus the young oyster sets when removed from the oyster setting trays are sufficently large to withstand their natural predatory enemies such as drills and starfish. Consequently with the method described, virtually all of the oyster sets placed in the natural beds will survive to maturity, whereas heretofore only a fraction of the young oysters placed in the sea would survive.

Figure 6:
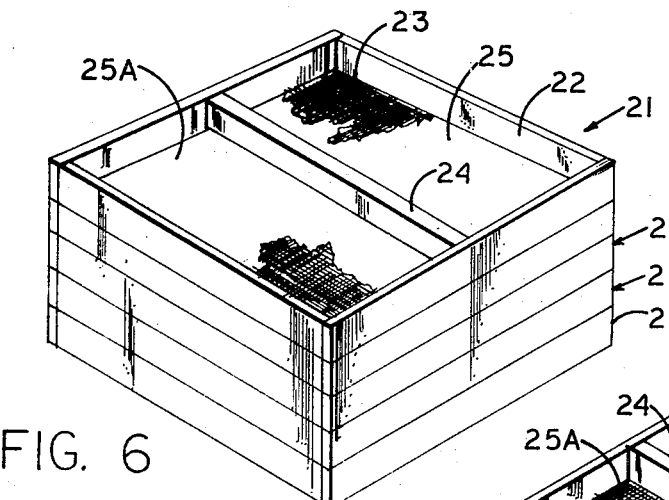
FIG. 6 illustrates the stacked arrangement of a plurality of trays constructed in accordance with the illustration of FIG. 5.
Figures 5, 5A:
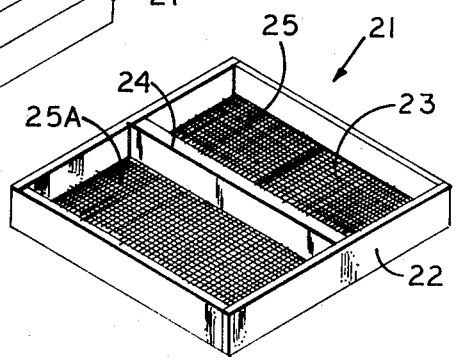
FIG. 5 illustrates a detail perspective view of a tray construction adapted to contain the "oyster sets" of the present invention.
FIG. 5A is a modified tray construction.

The means or apparatus by which the foregoing method may be practiced comprises a float or raft 20 of open construction and a series of trays 21 for containing a plurality of the young oyster sets. Referring to the drawings, and more specifically to FIGS. 5 and 6, the setting trays 21 in the illustrated form of the invention comprise a container having circumscribing end walls 22 connected to a bottom wall 23. As shown, the bottom wall 23 is formed of a screen mesh, preferably made of an inert material, as for example, nylon or the like. The circumscribing end walls 22 may be made of any suitable material, as for example, wood, plastic, metal or the like. If desired, a transversely extending cross piece 24 may be provided to divide or partition the tray or container into a plurality of compartments 25, 25A. In the illustrated form of the invention the trays 21 thus formed define a fully opened top container. The young oyster sets, when grown to approximately one-eighth inch size in a hatchery, are placed in the container compartments 25, 25A. The container is provided with a suitable cover as will be hereinafter described to confine the young oyster sets within the respective compartments 25, 25A. It will be understood that the mesh size of the bottom screen 23 of the respective trays 21 is such as to prohibit the passage of such small or young oyster sets therethrough.

The trays 21, when filled with such young sets, are then placed in the sea and are maintained in the sea adjacent the upper surface thereof so that the young oyster sets obtain the benefits of the warmer temperatures adjacent the upper surfaces of the water and the abundance of food generally found thereat.

To accommodate a maximum number of such oyster sets in a minimum amount of sea area, a plurality of such trays 21 are stacked in superposed relationship, one on the other, as evidenced in FIG. 6. In this arrangement the bottom wall 23 of an upper tray 21 forms the top or closure for the next subjacent tray 21. In this manner the respective oyster sets in each of the lowermost trays are confined therein.

Figure 7:
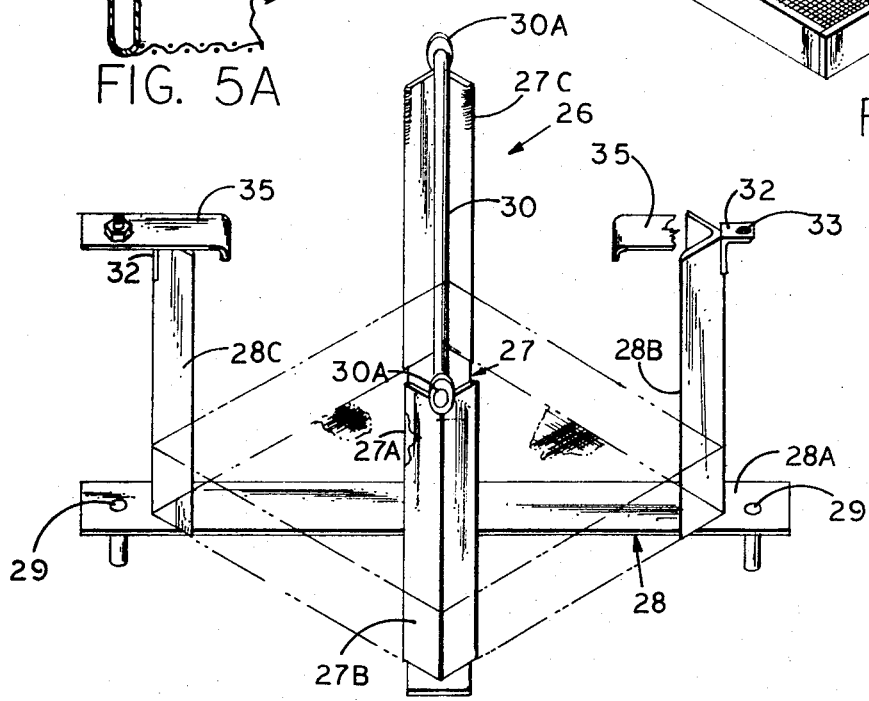
FIG. 7 illustrates a detail perspective view of a frame or stacking assembly adapted for maintaining the stack of "oyster set" trays of FIG. 6 in stacked relationship.
Figure 8:
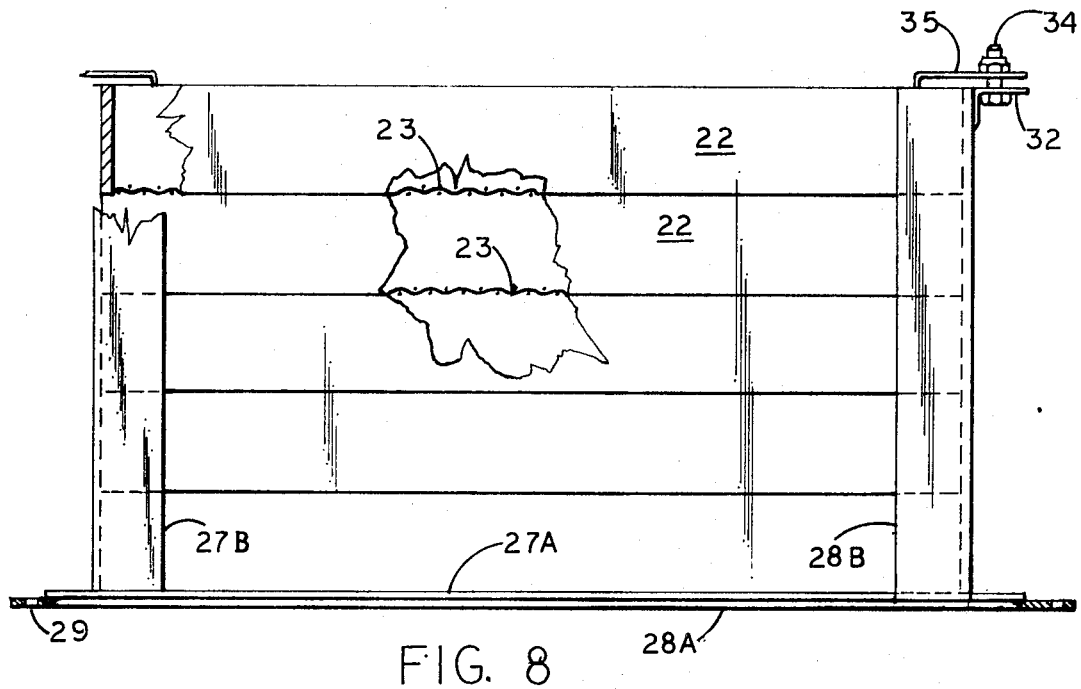
FIG. 8 is a side elevation view illustrating the stacked trays in assembled position within its stacking frame assembly.
Figure 9:
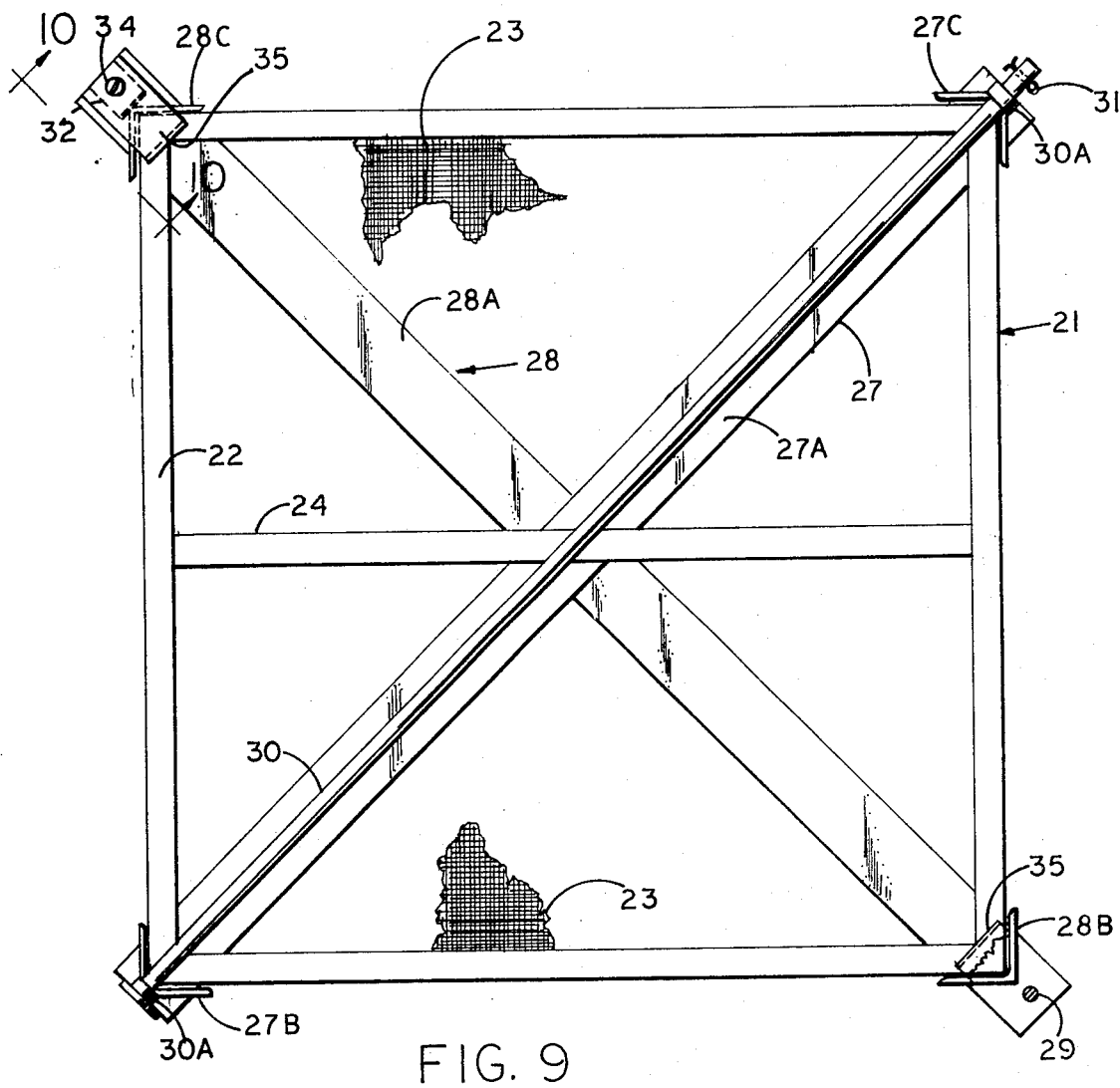
FIG. 9 is a top plan view of FIG. 8 having the bottom portions of the respective stacked trays broken away to better illustrate the details of construction of the stacking frame assembly.

The stacked arrangement of the trays 21, as seen in FIG. 6 are maintained by a holding or stacking frame assembly 26. As evidenced in FIGS. 7, 8 and 9 the holding or stacking frame assembly 26, for maintaining a plurality of setting trays 21, in stacked relationship comprises a pair of complementary frame members 27, 28. Each frame member 27, 28 comprises a base member or bar 27A, 28A which when assembled are disposed at substantially right angles with respect to each other in overlying relationship. Connected adjacent each end of the respective base members 27A, 27B or bars is a pair of opposed uprights 27B, 27C, 28B, 28C. In the illustrated form of the invention each of the uprights 27B, 27C, 28B, 28C is illustrated as an angular member, as for example, an angle iron, which is adapted to accommodate the corner portions of the stacked trays 21, as best seen in FIGS. 8 and 9, in the illustration. With the respective frame members 27, 28 angularly disposed as shown in FIG. 7, the respective stacked trays 21 can be readily placed on the intersecting overlying cross members 27A, 28A so that the respective corner portions of the setting trays are confined within the opposed angled uprights 27B, 27C and 28B, 28C. As seen in FIG. 7, the base member 28A of frame member 28 extends slightly beyond the respective uprights 28B, 28C with the extended portion being provided with an aperture 29 for receiving a fastener by which the frame member 28 may be fixedly secured to a float or anchoring means as will be hereinafter described.

In the form of the invention as shown in FIG. 7 the opposed uprights 27B, 27C of the other frame member 27 are provided with a means 30A adjacent the upper end thereof for receiving therebetween a cross or locking bar 30 which may function both as a means for securing the stack of setting trays 21 to the frame member 27 and a handle for lifting the stacked trays 21 and associated stacking frame member 27. As shown, the means 30A connected to the upper end of the opposed angled members 27B, 27C comprises a ring or loop for receiving the ends of the cross bar 30. Suitable means, as for example, cotter pins 31, or other suitable fasteners, may be provided for securing the handle cross piece and locking bar 30 between the opposed uprights 27B, 27C. It will thus be noted with the structure described the stack of setting trays 21 is secured to the frame member 27 between locking bar and handle 30 and the associated base member 27A.

Figure 10:
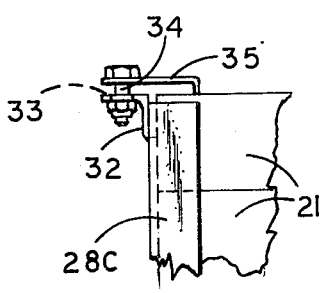
FIG. 10 illustrates an enlarged side elevation detail of construction of the stacking frame assembly.

Means are provided whereby the stacked setting trays 21 and connected frame member 27 can be suitably secured to the complementary stacking frame member 28. This is attained by providing the uprights 28B, 28C of frame member 28 with locking means for clamping to the trays 21. As seen in FIGS. 7 and 10 this is attained by securing an angled bracket 32, or the like, to the upper end of the opposed uprights 28B, 28C. As best seen in FIG. 10 the horizontal leg portion of the angled bracket 32 is provided with an aperture 33 for receiving a fastener 34 to secure thereto a holding clamp or plate 35. As shown, one end of the holding clamp or plate 35 is adapted to extend over the upper edge of the uppermost tray 21 of the stack of trays. Accordingly when the fastener 34, as for example, a nut and bolt combination, is tightened, the clamping plate 35 will securely clamp the opposed corners of the stacked trays 21 to the complementary frame assembly 28. In this manner, it will be noted, that the stack of setting trays 21 are firmly secured within the assembled holding frame assembly 26. The arrangement is such that the entire stack of trays 21 can readily be handled as a unit. The arrangement is such that the trays 21 may be rendered sufficiently buoyant so that they may be floated adjacent the surface of the water in a manner whereby the young oyster sets adapted to be contained therein will be maintained in a submerged position.

FIG. 5A illustrates a modified tray construction. In this form the end walls of the tray 21A may be formed of hollow or tubular material, e.g., plastic, metal or the like for added buoyancy and/or to reduce overall weight.

To facilitate the floating of the stacked trays 21 adjacent the surface of the water, a raft or float 20 of open construction is provided. Referring to FIGS. 1–4 the open raft construction comprises an open frame assembly made up of a plurality of rectangularly disposed longitudinally and transversely extending end members 40 and 41 which are rectangularly disposed to define the float. Suitable floatation means may be located preferably at the corners of the open float construction to provide the necessary buoyancy for maintaining the float assembly buoyant so that the upper surface thereof is maintained substantially level with the surface of the sea. Consequently the major portion of the float is maintained in a submerged position. As shown, the bottom of the open float construction is defined by a plurality of transversely extending supporting members 42. Also the respective sides and ends of the float 20 are provided with vertical stringers 43 located at spaced intervals therealong. The upper end of the raft or float is also provided with a plurality of longitudinally extending stringers 44 to provide for a firm construction and to support a plurality of readily removable upper transverse support members 45. The respective upper supports are removably supported between the end stringer 44 and intermediate stringer 44A to define the support means for the cover or top sheathing 46 which defines the upper surface of the float 20.

Figure 2:
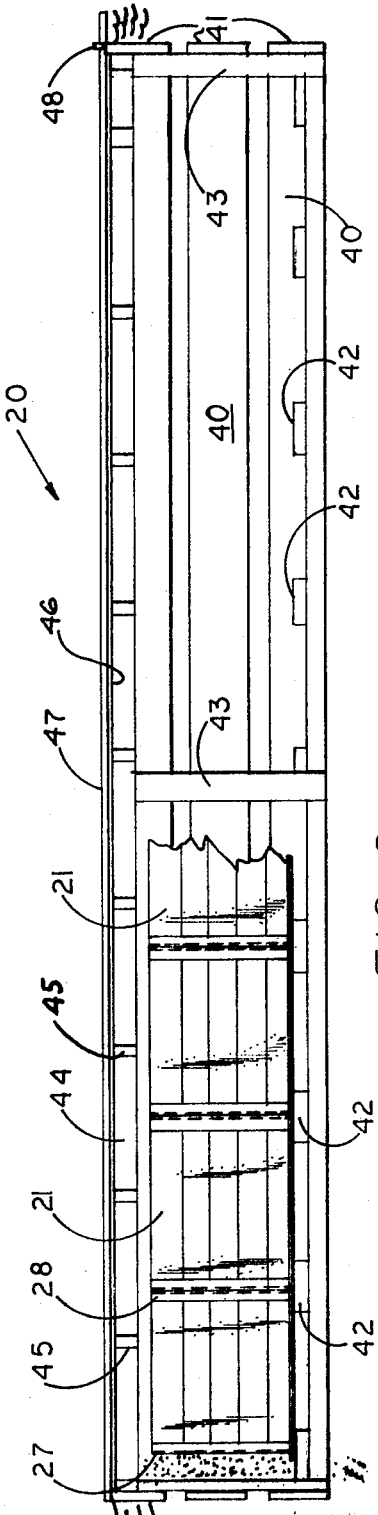
FIG. 2 is a side elevation view of the raft or float construction of FIG. 1 having portions thereof broken away.
Figure 3:
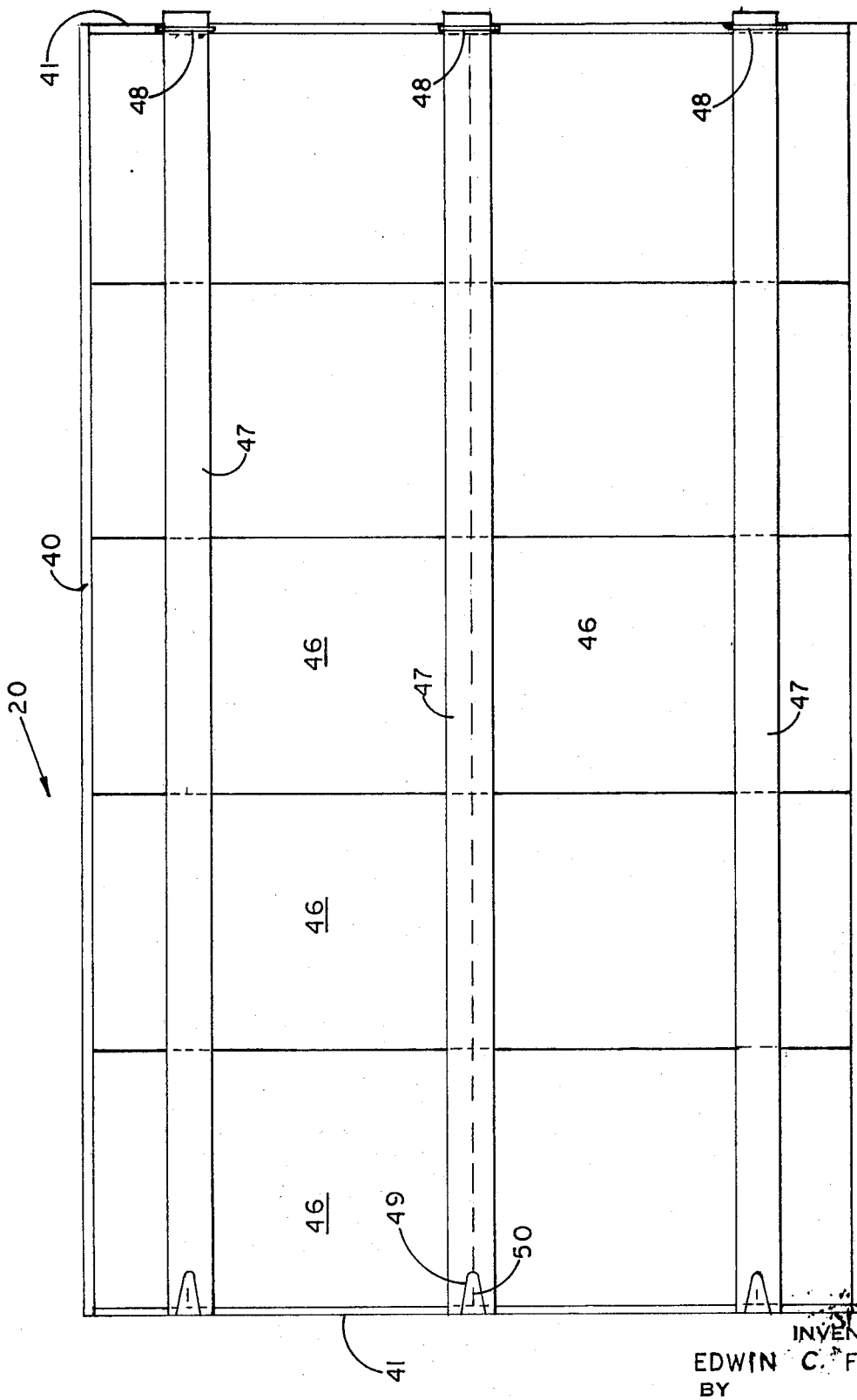
FIG. 3 is a top plan view of the float construction of FIG. 1.
Figure 4:
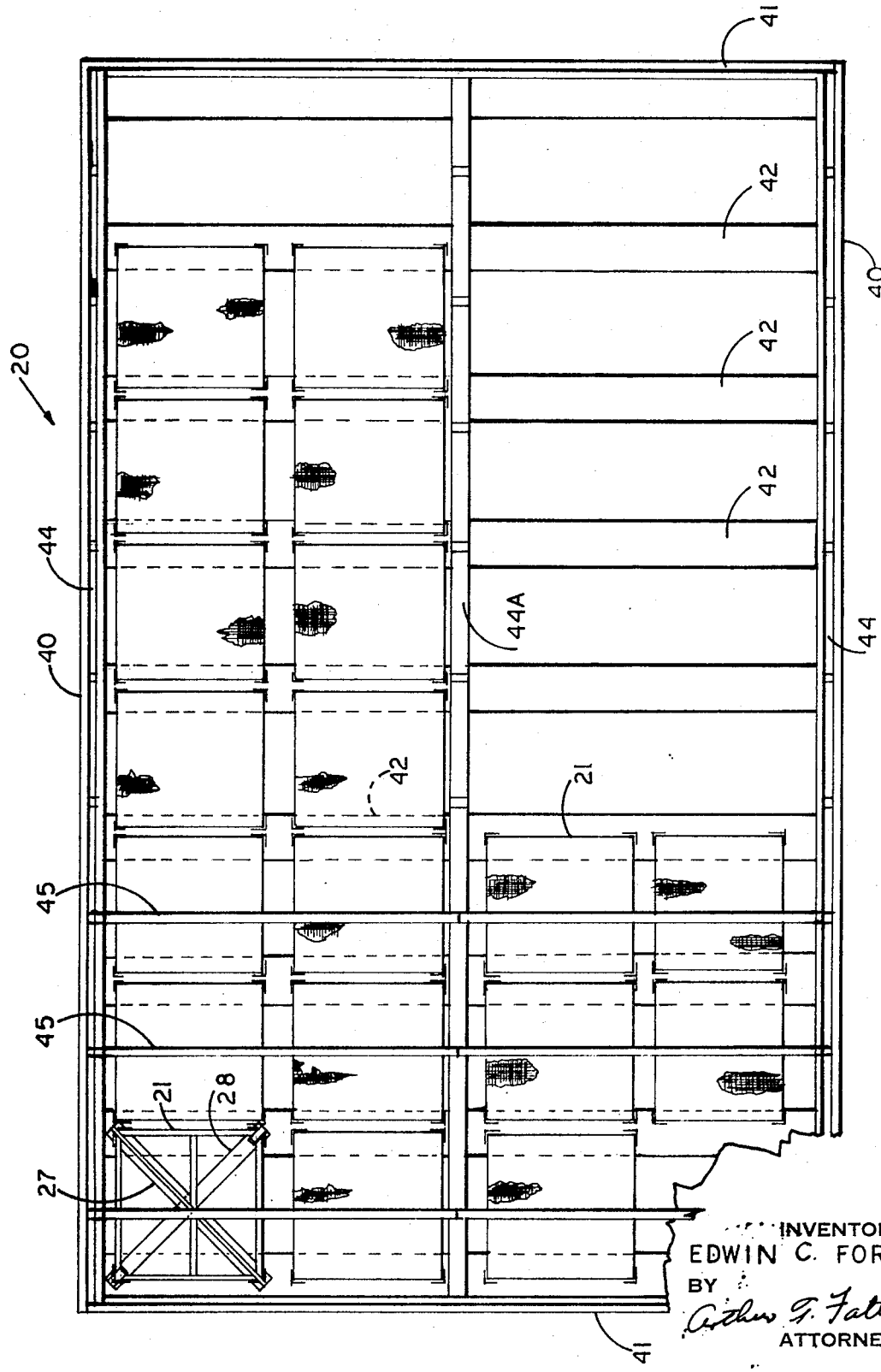
FIG. 4 is a top plan view of the float construction of FIG. 3 with the cover or closure thereof removed.

The float or raft 20 is made sufficiently large so as to accommodate a relatively large number of stacked trays 21. As best seen in FIGS. 2 and 4 the stacked trays 21 and associated stacking frame assembly 26 are constructed so that they can be readily supported on the adjacent pairs transversely extending bottom support members 42. The arrangement is such that one frame member 28 of assembly 26 may be fixedly secured to the bottom support members 42 by a suitable fastener extending through aperture 29 formed on the extended base member 28A.

The frame arrangement is such that the column or stack of trays 21 may be readily removed from the float merely by unclamping the holding plates 35 of the frame assembly 26 whereby frame member 27 and the stack trays 21 secured thereto can then be readily separated from frame member 28 secured to the float 20. Consequently, the holding tray assembly is such that the stack trays can be rendered readily removable and/or detachably secured to the float in a positive manner.

As best seen in FIG. 4 the float construction 20 can accommodate many stacks of trays 21 in a manner so that each of the respective stacked trays 21 is maintained in a submerged position adjacent the upper surface of the sea water. The open construction of the float 20 and the perforations provided by the bottom wall 23 of each of the respective setting trays 21 is such as to permit the sea water to be readily washed over the clutchless oyster sets or shellfish adapted to be contained within the trays. Also the arrangement is such that the natural wave action of the sea is such that it continually washes over the oysters thereby prohibiting the young sets from adhering to the trays. In this manner the young sets are maintained in a clutchless state until such time that they are sufficiently grown for placement in permanent growing beds.

To seal the uppermost tray of the respective stack of trays contained within the float a suitable cover may be provided. In the illustrated embodiment the cover or top of the float may also function as a cover for the uppermost tray. As shown, a plurality of cover sections define the top of the float. Each section 46 may comprise, as for example, a 4 × 8 sheet of suitable sheathing material. The arrangement is such that the cover section can be simply rested upon the side stringers 44 and the transversely extending support members 45.

If desired means may be provided for locking the respective cover sections 46 in position so as to avoid undesirable trespassers from disturbing the young sets. This is readily attained by securing the respective cover sections by means of a locking bar 47. As shown, a generally U-shaped latch 48, is connected adjacent to one end of the float for receiving one end of an associated locking bar 47. The other end of the locking bar is provided with a suitable means by which it may be locked at the other end with a padlock or the like. This is readily attained by connecting a hinge latch 49 to the other end of the float. The hinge latch 49 is provided with a slot for accommodating a lock loop 50 connected to the locking bar 47. Accordingly, by folding the flap of hinge latch 49 onto the locking bar, the lock loop will extend through the slot formed therein so that a conventional padlock will satisfactorily secure the closure sections in position so as to prohibit unauthorized access to the young sets contained in the trays. In this manner the oyster sets are secured against tampering by would-be trespassers. By confining the young sets in trays 21, they are protected from their natural enemies, as for example, drills or starfish. By the means described all of the young sets placed in the respective setting trays 21 and positioned on the floats can virtually be assured of reaching maturity. Also the arrangement is such that the young sets are maintained in the warmest portion of the sea during their early growing period, and where the maximum abundance of food is available. The warmer temperatures and the natural abundance of food are thus best utilized to enhance the growth of the young sets.

When the young sets have reached a size of approximately 1 inch, they are removed from the setting trays and placed in their permanent beds. Experience has indicated that when young oysters, for example, have achieved a 1 inch size, that they are relatively secure from their natural predators such as drills or starfish, and consequently their ability to grow to maturity is virtually assured.

Figure 12:
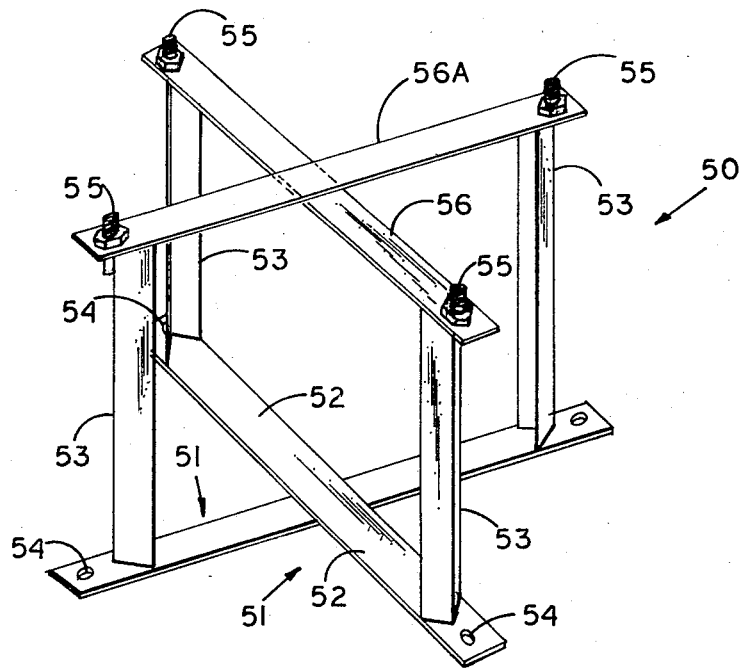
FIG. 12 illustrates in perspective a modified holding or stacking frame assembly construction.

A modified stacking frame assembly 50 is illustrated in FIG. 12. In this form of the invention the holding or stacking frame assembly 50 is defined by a pair of similarly constructed complementary frame members 51—51. Each frame member 51 comprises a base member 52 having connected thereto a pair of opposed uprights 53—53, e.g., angled bars, as hereinbefore described. The base member 52 of each frame member 51—51 extends slightly beyond the uprights and is provided with an opening 54 for receiving a suitable fastener by which the frame member may be secured between adjacent bottom supports 42 of the float or raft 20 in a manner hereinbefore described.

The upper end of the respective uprights 53 has secured thereto a means, e.g., a threaded shank or screw 55 between which an upper cross member 56—56A is secured. It will be understood that a suitable nut is adapted to be threaded to the shank 55 to maintain the upper cross member 56—56A in position therebetween. In all other respects the operation and function of the holding frame assembly of FIG. 12 is similar to that hereandbefore described.

For example, a column of stacked trays 21 may be secured between the uprights of one of the frame members 51 by securing the stack between the base member 52 and its cross member 56. Thus the upper cross member 56 serves both as a handle and a locking bar for securing the stack column of trays to the frame member. The stack of trays 21 and the secured frame member may thereafter be located relative to the other complementary frame member so that the respective corner portions of the trays may be located between the upright members of the associated frame members 51—51. The column of trays and the connected associated frame member 51 is secured to the other complementary frame member by extending the other cross piece 56A between the opposed uprights of its frame member in a manner hereandbefore described. The frame members 51—51 can then be suitably secured and/or placed in the raft or float in a manner hereandbefore described.

In this form of the invention, as shown in FIG. 12, the respective stacking frame members are identical in construction and therefore are rendered readily interchangeable. Thus maximum economy is afforded by rendering the respective frame members 51—51 identical in construction and operation.

Figure 11:
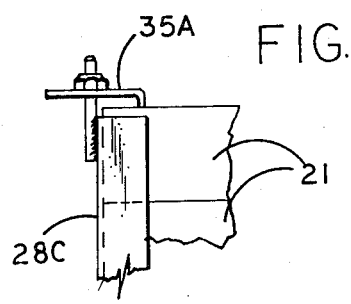
FIG. 11 illustrates a modified detail of construction.

FIG. 11 illustrates another modified form of the assembly. The construction of frame assembly of FIG. 11 is similar to that described with respect to FIGS. 9 and 10 with the exception that the clamping plate 35A is secured by means of a bolt welded directly to the upright 28C thereby eliminating the need for the bracket 32 as described with respect to FIGS. 9 and 10.

With the construction described it will be apparent that a method and apparatus is set forth whereby the protection and the growth of the relatively young sets is enhanced so that a maximum number of young sets are assured of reaching maturity. Also the method and means for accomplishing this result is such that the growth of the young oyster sets is enhanced by the growing thereof in the warmest portion of the sea and where a maximum abundance of food is rendered readily available. Protection of the young sets from their natural predators is also assured until such time that they are sufficiently large to withstand these enemies. The arrangement also enables a maximum number of young sets to be maintained in a minimum of natural sea area environment. Also the young sets are rendered readily movable so that the floats and the sets contained therein can be readily moved as may be required for maximum shelter and/or safety, e.g., due to storms, pollution, currents, tides etc.

While the specification has made reference to oyster sets, it will be understood that the method and apparatus described may be made applicable to the care and raising of other shellfish, e.g., clams, scallops and the like.

While this invention has been described with respect to a particular method and means for accomplishing the same it will be understood and appreciated that variations and modifications may be made without departing from the spirit or scope of the invention.

What is claimed is:

1. A setting tray for receiving young oyster sets comprising:
   an open top container including a bottom wall means and a circumscribing end wall means connected to said bottom wall means,
   one of said wall means being perforated to permit the free flow of sea water therethrough,
   said perforations being sized smaller than the size of the young "sets" adapted to be contained therein,
   and means forming a cover for said container for confining the "sets" within said container,
   means for securing a plurality of said containers in stacked superposed relationship, one on the other, wherein the bottom of one container defines the cover means for the next subjacent container,
   said securing means including
   a pair of complementary frame members,
   each of said frame members including a base member, and
   a pair of spaced upright members connected adjacent the opposed said base member,
   said base members of said frame members being adapted to be diagonally disposed so that said plurality of trays are adapted to be confined within the opposed uprights of the respective frame members,
   and means for securing said plurality of containers to said frame members.

2. The invention as defined in claim 1 wherein one of said wall means is formed of a buoyant material so that said tray is free to float adjacent to the surface of the water in a manner whereby the "sets" confined in said trays are maintained in a submerged position.

3. The invention as defined in claim 2 wherein said bottom wall is formed of a screen material.

4. The invention as defined in claim 3 wherein said screen material is formed of an inert material.

5. The invention as defined in claim 4 wherein said material is nylon.

6. The invention as defined in claim 1 wherein said securing means includes
a first means for securing said trays to one of said frame members,
and a second means for securing said trays and connected frame member to the other of said frame members.

7. The invention as defined in claim 6 wherein said first securing means includes a cross member extending between said opposed uprights of one of said frame members for clamping said plurality of containers between the base member of said frame and said cross member, and
said second means including a clamping means for securing said containers and connected frame to the opposed uprights of said other frame member.

8. The invention as defined in claim 7 wherein said clamping means includes
a bracket connected to the respective opposed uprights of said other frame member adjacent the upper ends thereof, and
a clamping plate adapted to be connected to said bracket,
said clamping plate extending over the upper edge of the uppermost tray,
and means for detachably securing said clamping plate between a clamping and unclamping position.

9. The invention as defined in claim 7 wherein said clamping means includes
a clamping cross bar extending between said uprights of said other frame member,
said clamping cross bar being adapted to overly the cross member of said first mentioned securing means,
and means for securing said clamping cross bar to said opposed uprights of said other frame members.

10. The invention as defined in claim 1 and including means defining a float for floating a plurality of said containers adjacent the surface of the water.

11. The invention as defined in claim 10 wherein said float comprises
an open raft structure,
floatation means for maintaining said open raft structure buoyant,
transversely extending supports disposed along the bottom of said raft,
said trays being adapted to be supported on said supports,
and a closure for sealing the trays within said raft.

12. A float for protecting young oyster sets and for enhancing the growth of young oyster sets in natural sea water environment comprising
an open raft structure to permit the free flow of sea water therethrough,
means for maintaining said raft buoyant in sea water so that the top of said raft is substantially level with the surface of the sea water,
a plurality of trays adapted to be received within said open raft structure, whereby said trays are submerged in the sea water flowing therethrough,
each of said trays comprising an open top container having perforated wall portions to permit the sea water therethrough,
means forming a closure for said containers to confine the "oyster sets" therein,
and means for securing said tray to said float,
said last mentioned means comprises a frame for securing a plurality of trays in stacked relationship within said open raft structure,
said frame including a pair of complementary frame members,
each of said frame members including a base member and opposed uprights connected adjacent the ends of said base member,
means for securing one of said frame members to said raft structure,
means for securing a plurality of stacked trays to the other of said frame members,
and means for securing said stacked trays and connected other frame member to said one frame member.

13. The invention as defined in claim 12 and including a closure for sealing said trays within said open raft structure.

14. The invention as defined in claim 12 wherein said pair of complementary frame members are identical.

* * * * *